United States Patent [19]
Sykes

[11] B 3,986,208
[45] Oct. 12, 1976

[54] DATA RECORDING WITH HIGH SPEED SEARCH CAPABILITY

[75] Inventor: John R. Sykes, Rochester, N.Y.

[73] Assignee: Sykes Datatronics, Inc., Rochester, N.Y.

[22] Filed: Oct. 21, 1974

[21] Appl. No.: 516,069

[44] Published under the second Trial Voluntary Protest Program on March 16, 1976 as document No. B 516,069.

[52] U.S. Cl. .................................. 360/49; 360/27
[51] Int. Cl.² .......................................... G11B 5/09
[58] Field of Search .................. 360/40, 49, 27, 72, 360/73, 51

[56] References Cited
UNITED STATES PATENTS

| | | | |
|---|---|---|---|
| 3,214,736 | 10/1965 | Glaser.................................... | 360/49 |
| 3,654,618 | 4/1972 | Kandz et al............................ | 360/72 |
| 3,727,203 | 4/1973 | Crossman .............................. | 360/72 |
| 3,863,265 | 1/1975 | Klumpp ................................. | 360/72 |

Primary Examiner—Vincent P. Canney
Attorney, Agent, or Firm—Martin Lukacher

[57] ABSTRACT

A system of and method for writing and reading data on magnetic tape records having the capability of searching for certain data files in which selected messages are written is disclosed. The files are written successively on the tape with a name block which identifies or describes the files and data block which constitute the files written alternately to constitute the file format. The file names are written at much less than the normal data density. When reading the files, search operations are carried on at high tape speed; the ratio of the high tape speed to normal tape reading speed being the same ratio as the ratio of the normal density of recording of the data block to the lower density of recording of the file names in terms of bits per linear inch. The bit rate produced while reading the file names at high speed is then exactly equal to the bit rate generated while reading data blocks at low speed. Searches for selected files are conducted by comparing file names read from the tape with the names of the selected files while the tape is transported at high speed. Reading is carried out such that only data produced at the normal bit rate is read out and decoded. Thus, the tape speed selected is determinative of whether a search mode or data reading mode of operation is employed; special decoding logic or tracks for obtaining address data when tapes are driven in high speed search modes being eliminated.

17 Claims, 4 Drawing Figures

DATA RECORDING WITH HIGH SPEED SEARCH CAPABILITY

The present invention relates to methods of and apparatus for data recording and particularly to methods and apparatus for data recording which afford facilities for high speed retrieval of selected data items recorded successively along a continuous record medium.

The invention is especially suitable for use in magnetic tape recording systems which employ miniature tape cartridges (also called cassettes) and may be used to provide very rapid access to data written or recorded on such tapes contained in such cartridges.

High speed access or search capability in data recorders is highly desirable in order to rapidly find selected items of data which may be located among several thousand possible locations or addresses on a tape record. Even in the case of tapes contained in miniature cartridges, the tape may be hundreds of feet long and contain a thousand or more of such addresses. My U.S. Pat. No. 3,714,382 issued Jan. 30, 1973 describes a method and system for high speed search in which the rotations of a reel on which the tape is wound are sensed and counted to determine the duration of a high speed search. Addresses recorded on the tape are then read at normal reading speed to obtain access to the selected data item. Other systems provide facility for reading addresses while tape is moving at high speed, see U.S. Pat. Nos. 3,214,736 and 3,541,271. Such systems however require special address coding and consequently complex encoding, decoding and control logic in order to utilize the addresses in searching for selected data items.

Data items may be in the form of data or messages which contain information related in some manner and are referred to as "files." Data which identifies a file and which may contain information descriptive of the file, is referred to as the file name. The file name may include data in character groups within the file name which is descriptive of data within the file. Such groups are referred to as "descriptors." A file name block thus may contain a number of descriptors. As an example, consider a personnel file, the file name block may contain a first descriptor in which data representing an employee's name is recorded. The next descriptor may contain data representing his salary bracket, the next his present salary, the next his date of employment, the next his job classification, and so forth.

It is therefore a principal object of this invention to provide improved methods of and apparatus for data recording which facilitates rapid access to selected items of recorded data, such as selected files.

It is a further object of the present invention to provide improved methods of and apparatus for high speed retrieval of selected data items, for example file names and/or descriptors, even when such items are recorded at different locations which may be arranged randomly along an extremely long record medium such as a magnetic tape record.

It is a still further object of the present invention to provide methods of and apparatus for data recording whereby rapid searches for multiple items of data can be carried out at much higher speeds than the speed at which the data items themselves are read from the record.

It is a still further object of the present invention to provide improved methods of and apparatus for data recording which affords high-speed search capability without the need for special sensing of tape reel rotation or other tape movement, and without complex control encoding and decoding equipment.

It is a still further object of the present invention to provide improved methods and apparatus for data recording whereby such rapid searches can be carried out during reverse high-speed type motion as well as during forward high speed tape motion.

Briefly described, apparatus for writing and reading data signals on a tape record medium embodying the invention includes means which provide different access times for different items of data; more rapid access being provided for data items such as file names than for data in the files themselves, or for data descriptive of certain information contained in the files. The system includes means for writing data signals representing each of the different items at a different, successively higher density on the record medium. Means for reading the data signal is operative to provide different successively lower speeds of travel of the record medium, each corresponding to a different one of the densities. By recording file names and descriptors at lower density, the tape may be transported at high speed during reading, when searching for the data items corresponding to such file names or descriptors. When the file names are located, the tape speed may be reduced to normal reading speed to read the data items which are recorded at high density. The ratio of the speeds may be the same as the ratio of the recording densities. The data signals which contain the information desired are then always read from the tape at the same data rate. By reading or decoding data signals only at this single data rate, whether the search mode or the data reading mode is selected, only the desired data items will be read out. Complexity in design of the tape transport or of the encoding, decoding and control logic in the apparatus is thereby avoided. The reading apparatus, such as the amplifiers and decoding logic may also be optimized so as to read only data at the single rate; thus further simplifying the apparatus and enhancing data recording performance.

The foregoing and other objects, advantages and features of the invention will become more readily apparent from a reading of the following description in connection with the accompanying drawings in which.

Figure 1:
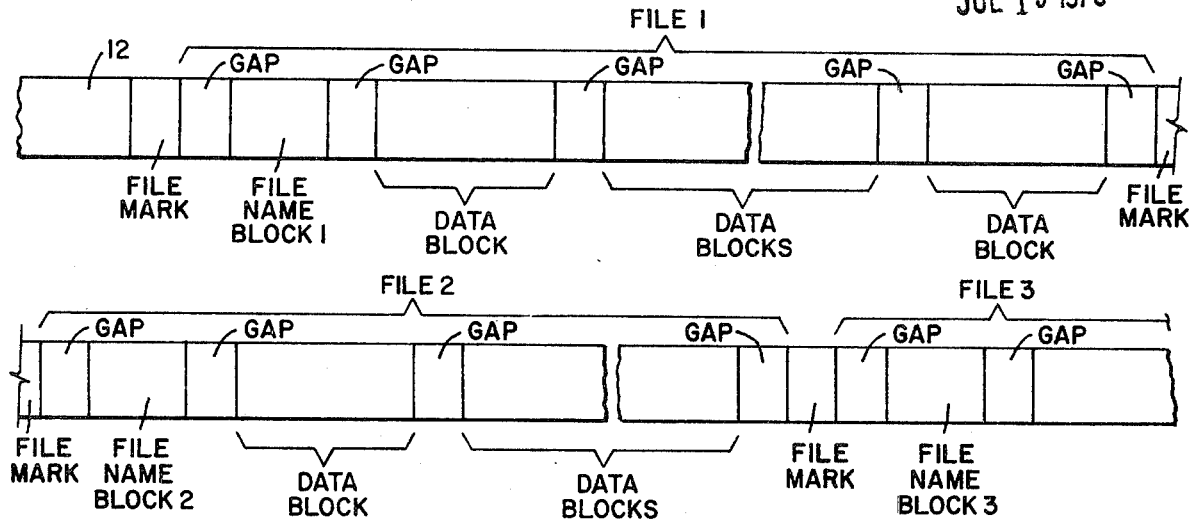
FIG. 1 is a diagrammatic view of a length of magnetic tape records showing the format in which files and file names may be recorded in accordance with the invention.

Referring more particularly to FIG. 1, there is shown a segment of a length of magnetic tape which may be at the leading end of 300 feet of tape which may be contained in a miniature data cartridge, say the DC 300A cartridge sold by the 3M Company of Minneapolis, Minn. The first two files on the tape are shown. At the head of each file is a file mark and a file name block. The file mark indicates the start of a file. After a short gap comes the file name block. This block may contain several multi-bit characters or bytes which are written serially at a first and lowest recording density, which for illustrative purposes is indicated as being 178 bits per inch (bpi). Each of these characters may contain eight bits which represent an alphanumeric character. The file name block may contain fifteen characters. The eight bits may be recorded as by any conventional recording technique such as the so-called phase modulation or Miller recording technique. Other recording techniques such as NRZI may also be used. The density of recording is taken linearly along the tape. In other words, in the file name block the density in the illustrated tape is 178 bits per inch (linear) along the length of the tape.

After the file name block, another gap is provided. This gap, as will become more apparent hereinafter, accommodates the slowing of the tape from high speed search to normal reading speed such that data blocks which follow the gap will be properly positioned for read out. A number of such data blocks may be provided in each file. For example, each file may have three data blocks of 200 characters each, each block of data is separated by a gap. Each block may be recorded in accordance with a format having a preamble and a postamble, such that each block and the data therein may properly be identified and utilized in a computer or computer terminal system with which the data recorder is associated. The filie terminates with an end of file gap followed by the file mark of the next file.

It will be observed therefore that the file name blocks, which contain data representing or identifying the data in the associated file, are recorded alternately with the data blocks along the length of the tape.

The data blocks are recorded at high density, which is desirably the normal recording density. The density is indicated for purposes of illustration as being 1600 linear bits per inch.

Figure 2:
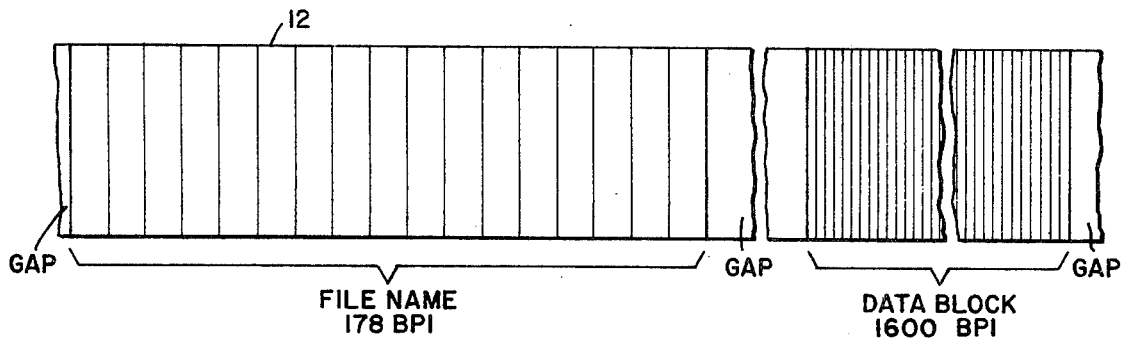
FIG. 2 is an enlarged view showing a segment of the tape illustrated in FIG. 1.

FIG. 2 shows an enlarged segment of the file format. The much lower density at which the tile name is recorded is indicated with respect to the much higher density recording of the data block by the closer spacing of the vertical lines, each of which designates the limits of a bit cell, in the data block region than in the file name region of the tape.

In the event that an extended search is desired, another descriptor block may be provided as an additional character group in the file name block. This descriptor may be recorded at the tail end of the file name block as indicated in FIG. 1 (i.e. between the file name block and the first data block in each file). The descriptor is recorded at a density intermediate the density of the file name and the data block; for example, at 400 bits per inch in the case of a single descriptor. This descriptor may contain information in addition to file names. For example in the case of personnel files, the descriptor may contain the salary of the employee whose personnel information is contained in the files. During reading at a tape speed corresponding to the descriptor density, the tape may be controlled or programmed so as to stop and read the data blocks of those files on employees having salaries up to a certain sum. Other descriptors may be provided. Also, searches of file names followed by descriptors for a certain file name and descriptors having selected information can be programmed. In this way the areas of search can be progressively refined.

Figure 3:
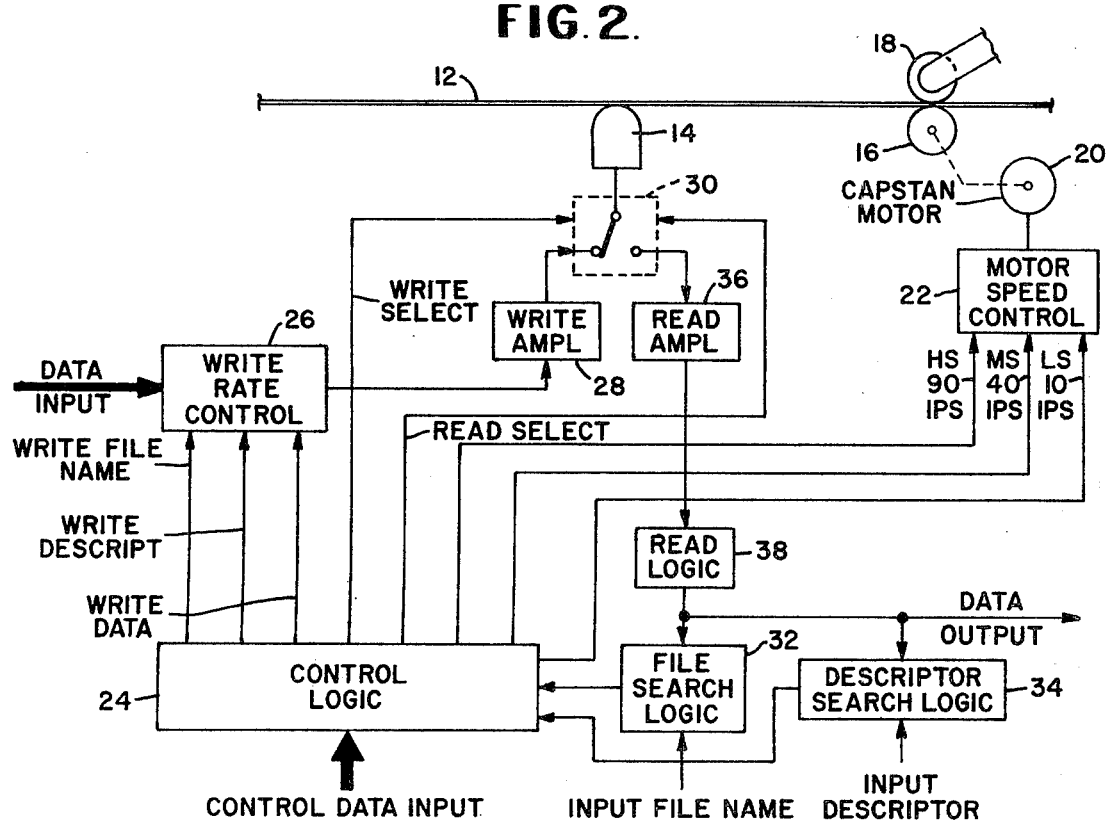
FIG. 3 is a functional block diagram illustrating a system embodying the invention.

Referring to FIG. 3, there is shown a magnetic tape record 12 which is transported past a magnetic head 14 which is adapted to record (write) or playback (read) data signals representing the above-mentioned eight bit characters on the tape 12. The tape is transported or driven by a capstan 16 and pressure roller 18 arrangement. The capstan 16 is driven by a capstan motor 20 which may be a variable speed motor or synchronous motor which is adapted to be locked to different selected speeds by having alternating current of frequencies corresponding to those speeds applied thereto from a motor speed control circuit 22.

Three speeds are indicated as being provided by the motor speed control, a low reading speed (LS) of 10 inches per second ips, a high speed (HS) for file name search purposes of 90 ips and an intermediate speed (MS) for descriptor field search purposes of 40 ips. Each speed may be selected by the application of a corresponding command HS, MS or LS to the motor speed control 22 from control logic 24. The control logic 24 has control data inputs, as from a computer or terminal unit with which the data recorder operates. Data inputs for writing on the tape 12, obtained from the computer or terminal, are applied to the head via a write rate control 26. A write amplifier 28 and a read/write switch 30. The switch 30 may be a relay or solid state switch controlled by write select or read select commands from the control logic 24. The switch 30 is indicated as being in the write position. The control logic translates the control data input into write file name, write descriptor, or write data control levels which are applied to the write rate control 26.

During all writing operations, the control data input conditions the control logic to output the LS command to the motor speed control 22. The capstan motor 20 is then run at low speed and the tape transported across the head 14 at the low reading speed of 10 ips. When the control data indicates that the file name is to be written, the write rate control 26 clocks the data into the write amplifier 28 and then into the head for writing on the tapes at low repetition rate, which in this illustrative example is 1.78 KHz. With a tape speed of 10 ips the density at which the file names are recorded is 178 bits per inch (bpi). When the control data input indicates a descriptor is to be written, the write descriptor level causes the data to be clocked into the write amplifier and written by the head 14 on the tape 12 at a rate of 4 KHz. The density of the descriptive field then is 400 bits per inch (bpi). Finally, when a write data level is applied to the write rate control 26, the data is clocked into the write amplifier for writing on the tape at a 16 KHz rate, such that the density of the data block is 1600 bpi.

When the reading mode is selected, the name of the desired file name is inputted into file search logic 32. The desired descriptor is inputted to the descriptor search logic 34. Data is read from the tape by way of the switch 30, which connects the head to a read amplifier 36. The read amplifier 36 is desirably tuned to read at normal reading rate which is 16 KHz. The data from the amplifier 36 is applied to read logic 38 which is conditioned to decode only data having a repetition rate of 16 KHz.

When high speed search is selected by the control logic 24, the HS command is applied to the speed control 22 and the capstan motor and capstan 16 pressure roller 18 arrangement is operative to drive the tape at 90 ips. The file names which are recorded at 178 bits per inch are then read from the tape at a rate equal to the product of the density and the tape speed (178 bpi multiplied by 90 ips) or 16 KHz (i.e., 16 thousand bits per second). Accordingly, the file names are decoded in the read logic 38 and applied to the file search logic 32 where they are compared with the input file name.

Upon an indication that the file name read from the tape and the input file name are the same, an output command is applied to the control logic 24 so as to produce a command to reduce the tape speed.

In the event that a descriptor search is to follow a file name search the intermediate speed of 40 ips is selected by a MS command from the control logic 24. The tape is then read at 40 ips and data is read from the tape at a rate equal to the product of the density of the data in the descriptor field (400 bpi and 40 ips or again at the 16 KHz). Data read from both the data block and the file name blocks is at a different rate which is not effectively decoded by the read logic 38. The output of the read logic 38 is applied to the descriptor search logic 34, either directly or through a switch which connects the read logic to the descriptor search logic 34. When the descriptor search logic 34 detects that a descriptor read from the tape and the input description are the same, the descriptor search logic 34 provides an output to the control logic 24 to change the speed of the tape by generating a LS command which is applied to the motor speed control 22. The tape is then driven at normal reading speed of 10 ips and amplified in the read amplifier 36. The data blocks are then decoded by the read logic 38, since the data blocks produce output data at the rate equal to the product of 1600 bpi and ten ips, or 16 KHz which is the rate to which the read amplifier is tuned and the read logic 38 operates. The read logic 38 is also designed to decode only data at the 16 KHz rate.

It will be noted therefore that the ratio of the densities at which data is recorded on the tape is the same as the ratios of the tape speed. These ratios being 178 bpi/1600 bpi or 1/9 in the case of the ratio of file name density to data block density. The ratio is ¼ or 400 bpi/1600 bpi in the case of the ratio of the descriptor to data block densities.

Figure 4:
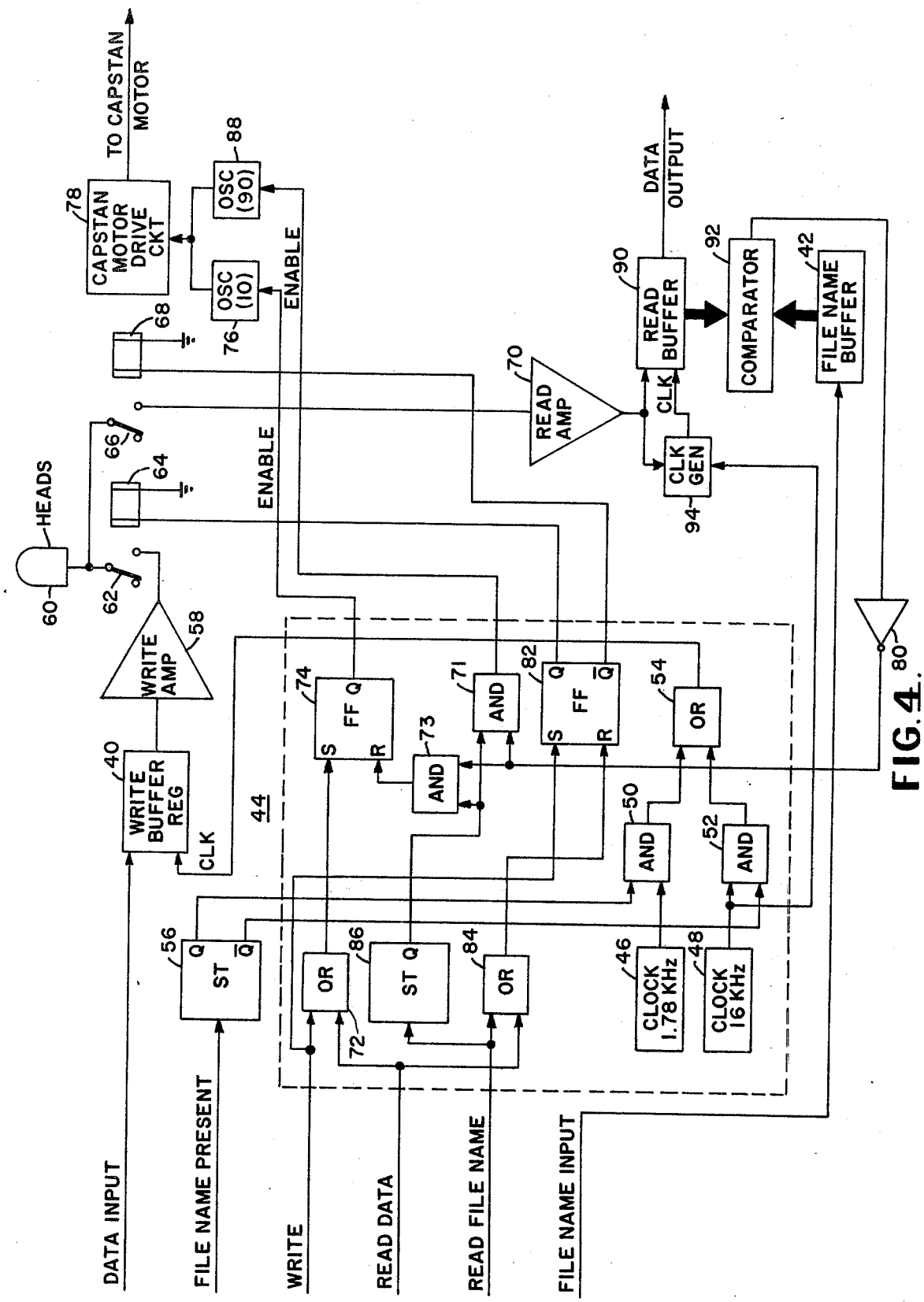
FIG. 4 is a more detailed block diagram illustrating a system embodying the invention.

FIG. 4 is a more detailed block diagram of a system similar to the system shown in FIG. 3, which is adapted for high speed file searching. The data input line is applied to write buffer registers 40 while the data representing the name of the file which is selected is inputted into file name buffer registers 42, as by a clock from the data source, which may be a computer or terminal (not shown). The control data inputs include control levels indicating whether a file name is present and commands for writing and reading of data and of file names. These control levels and commands are applied to control logic 44.

Associated with the control logic are two clock pulse sources 46 and 48. The source 46 provides clock pulses at a 1.78 KHz rate, while the source 48 provides pulses at a 16 KHz rate. These pulses are gated via AND gates 50 and 52 in the control logic 44 and thence via an OR gate 54 to the clock input of the write buffer registers 40 to shift data out of these registers.

A file name present command operates a trigger circuit 56 such as a Schmidt trigger (ST) which enables the gate 50 while inhibiting the gate 52. The 1.78 KHz clock pulses are then applied to the registers 40 and data in these registers is clocked out into write amplifiers 58 at a 1.78 KHz rate.

The write amplifiers 58 are connected to the heads 60 which write the data signals on the tape through contacts 62 of a relay 64. Contacts 66 of another relay 68 connect the head 60 to read amplifiers 70. Only one contact of each relay is shown to simplify the illustration, there being one for each head channel. The write amplifiers 58 are broad band in operation being adapted to pass data at a 1.78 KHz rate and also at a 16 KHz rate, when clocked out of the register 40 during the writing of the data blocks. The read amplifiers 70 are preferably tuned to the 16 KHz data rate.

A write command is applied by way of an OR gate 72 in the control logic 44 to set a flip-flop 74. The flip-flop 74 when set, applies an enabling level to an oscillator 76. The oscillator 76 generates AC drive signals which are applied to the capstan motor drive circuit 78. The capstan motor drive circuit may be an amplifier which amplifies the signals from the oscillator 76 and applies these signals to a synchronous capstan motor. The frequency of the oscillator 76 is selected such that the capstan motor drives the tape at the 10 ips speed. Accordingly, when the file name present command enables the gate 50, the tape is moving at 10 ips and the density of the data signals recorded on the tape is at 178 bpi.

The write command sets another flip-flop 82 in the control logic 44. This flip-flop 82, when set, applies an operating voltage to the operating winding of the relay 64 while ground is applied to the operating winding of the relay 68. The relay 64 is then operated (pulled in) and connects the write amplifiers 58 to the head 60. When the flip-flop 82 is reset, as by a read data or read file name command being applied to reset the flip-flop 82 via an OR gate 84, the operating voltage is applied to the winding of the relay 68 while ground is applied to the relay 64 winding. Thus, the contacts 62 disconnect the head from the write amplifiers and the contacts 66 connect the head to the read amplifiers. The flip-flop 74 has an input circuit such that a re-set command has priority over a set command. This input circuit may be provided by a diode in the set input of the flip-flop 74 which is biased to block the set input when a re-set command is applied. The read file name command applies such a re-set level to the flip-flop 74 by operating a trigger circuit 86 which resets the flip-flop 74 and applies an enabling level to another oscillator 88. The oscillator 88 is then enabled while the oscillator 76 is inhibited.

The oscillator 88 generates a higher frequency alternating current voltage which is applied to the capstan motor drive circuit 78 and drives the synchronous capstan motor at a higher speed. This higher speed corresponds to a tape speed of 90 ips. Accordingly, when a read file name command appears the tape is driven at 90 ips and the contacts 66 of the relay 68 connects the head 60 to the read amplifier 70. The system is then conditioned for a file name search operation.

Data blocks are written on the tape in the absence of a file name present command during the write mode of operation. Then the gate 52 is enabled, the clock 48 clocks data out of the write buffer register 40 at a 16 KHz rate. Since the tape is then driven at 10 ips the data is recorded in the data block at 1600 bpi.

Connected to the read amplifiers 70 are read buffer registers 90. These registers may be shift registers. The clock pulses from a read clock generator 94 (wherein the clock pulses from the clock source 48 are retimed to be synchronous with the self clocked data signals from the tape, a phase locked loop being suitably included in the generator 94) at the 16 KHz rate are applied to the shift input of the registers 90 and clock the signals from the read amplifier into these registers 90. The registers also have the data available at their outputs at the 16 KHz clock rate. The parallel output of the registers 90 are connected to a comparator 92 which also has the parallel outputs of the file name buffer registers 42 connected thereto. During a read file name or search operation, the tape is travelling at 90 ips. The read data command is applied simultaneously with the read file name command. Data in the file corresponding to the selected file names is read from the tape. Only data read from the tape at the 16 KHz rate will be decoded by the buffers 90. The data blocks which are recorded at a much higher density, thus are read at a much higher rate and do not produce data signals which are effectively transmitted by the read amplifier 70, nor are decoded by the buffers 90. Only the file name blocks are read and decoded at the 90 ips tape speed. The file name data is then presented at the input to the comparator 92 by the read buffers 90. When the file name read from the buffers 90 is the same as the file name in the storage buffers 42, the comparator 92 produces an output which is inverted in the inverter 80 and inhibits AND gates 71 and 73. The AND gate 71 cuts off the enabling level to the high frequency oscillator 88 while the AND gate 73 permits the flip-flop 74 to return to the set condition such that the low frequency oscillator 76 is again enabled. The capstan motor drive circuit 78 and the capstan then drive the tape at the low or normal reading speed. The data blocks adjacent to the file name are then read; data signals being derived therefrom by the heads at the 16 KHz rate. The read buffers provide this data at the data outputs therefrom.

From the foregoing description it will be apparent that there has been provided improved method of and apparatus for data recording which provides a high speed search capability for specified data items even though located at random along a long continuous tape record such as a magnetic tape record. The systems have herein been described for purposes of illustrating the invention and variations and modifications therein within the scope of the invention will undoubtedly suggest themselves to those skilled in the art. Accordingly, the description should be taken merely as illustrative and not in any limiting sense.

What is claimed is:

1. For use in apparatus for writing and reading data signals on a tape record medium, a system for providing different access times for different items of data, said system comprising means for writing data signals representing each of said different items at different successively higher densities on said medium, and means for reading said data signals from said tape when said tape is travelling at different successively lower speeds, each corresponding to a different one of said densities whereby to provide access to items of data written at the lowest of said densities in the shortest time.

2. The invention as set forth in claim 1 wherein said reading means includes means for transporting said record medium at different speeds, the ratio of said different speeds being the inverse of the ratio of the densities corresponding thereto, whereby said data signals are all read from said tape record medium at the same repetition rate.

3. The invention as set forth in claim 2 wherein further means are included in said reading means for providing data output signals only in response to data signals read from said tape at said same repetition rate.

4. The invention as set forth in claim 2 wherein said writing means includes means for driving said tape when said data signals are being written thereon at the speed corresponding to the highest of said densities, and means for applying said data signals corresponding to said different items to said tape at different rates such that said different items are written on said tape at the density corresponding thereto.

5. The invention as set forth in claim 3 wherein said reading means includes means for changing the speed of travel of said tape from a higher to a lower of said speeds when certain data is read from said tape while said tape is travelling at said higher speed so as to present data, which is written on said tape at the density corresponding to said lower speed and is located adjacent said certain data, for read-out from said tape.

6. The invention as set forth in claim 5 wherein said speed changing means includes a first register for storing said certain data, and search logic means for comparing data read from said tape with said data in said register and providing an output in response to correspondence therebetween, and control logic means for operating said tape drive means to lower the speed of said tape when said last named output occurs.

7. The invention as set forth in claim 6 when said search logic means includes a second register, means for reading data signals from said tape with said tape travelling at said higher tape speed and storing said signals in said second register, and a comparator for comparing the data in said first and second registers for providing said output.

8. The invention as set forth in claim 3 wherein said writing means includes means for providing clock pulses at a plurality of different rates each corresponding to a different one of said densities, and means responsive to said clock pulses for writing said data signals onto said tape at the density corresponding thereto, said reading means including means responsive to said clock pulses having the highest of said different rates for providing said data output signals.

9. The invention as set forth in claim 8 wherein said data output signal providing means includes a buffer shift register, means for applying data signals read from said record medium to a data input of said buffer shift register, and means responsive to said highest rate clock pulses coupled to a shift input of said register for clocking data signals into and out of said register when such signals are applied to said data input thereof at the same nominal rate as the rate of said highest rate clock pulses.

10. The invention as set forth in claim 8 further comprising control logic means for selectively applying said clock pulses of different rates to said clock pulse responsive means and for providing control signals to said tape speed control means both in response to control data inputs to said apparatus.

11. A method for providing rapid access to different data items recorded on a tape record medium which comprises the steps of writing said items and data descriptive of said items in alternate locations disposed along said tape with said items at a higher density than said descriptive data, and reading said tape at a first speed corresponding to said descriptive data density until the data descriptive of a selected one of said data items is read from said tape, and then reading said tape at a second speed corresponding to said higher density of said data items for reading said one selected data item.

12. The invention as set forth in claim 11 wherein said writing step is carried out by first transporting said tape at said second speed, and then writing said descriptive data at a first rate and said items at a second rate which bears to said first rate the same ratio as said first speed bears to said second speed, said second speed being much lower than said first speed.

13. The invention as set forth in claim 12 wherein said writing step further includes the steps of storing said signals representing descriptive data and said data items with the aid of a register and clocking said data signals representing said descriptive data out of said register with clock pulses having a first repetition rate and said data signals representing said data items with clock signals having a second repetition rate, said first clock pulse rate corresponding to said first writing rate and said second clock pulse rate corresponding to said second writing rate.

14. The invention as set forth in claim 11 wherein said reading step is carried out by transporting said tape at said first speed and reading data signals which are repetitive at a rate corresponding to the product of said lower density and said first speed, and then transporting said tape at said second speed and reading data signals which are repetitive at the same rate, said second speed being lower than said first speed and being such that the product of said second speed and said higher density is equal to the product of said first speed and said lower density.

15. The invention as set forth in claim 11 wherein said reading step further includes the step of comparing said descriptive data as said data is read from said tape with descriptive data corresponding to the selective data item, and changing said tape speed from said first and higher speed to said second and lower speed when said comparison indicates said descriptive data are the same.

16. The invention as set forth in claim 14 where said reading step further includes reading data from said tape into a first register at said rate.

17. The invention as set forth in claim 16 wherein said reading step further includes the steps of storing data corresponding to the descriptive data which in turn corresponds to the selected data item in a second register, comparing the data stored in said first and second registers, and changing the speed of said tape to said lower second speed when said comparison indicates the data in said registers are the same.

* * * * *